United States Patent
Priest et al.

(10) Patent No.: US 10,607,798 B2
(45) Date of Patent: Mar. 31, 2020

(54) POWER SWITCH DEVICE WITH SHAPE MEMORY ALLOY ACTUATOR

(71) Applicant: TE CONNECTIVITY CORPORATION, Berwyn, PA (US)

(72) Inventors: Marcus Priest, Carpinteria, CA (US); Manik Singh Sethi, Budd Lake, NJ (US); Gordon Haag, McKinleyville, CA (US); Giulia Klein, St. Thomas, VI (US); Xiaozheng Xu, Markham (CA); Suraj Shroff, Nashua, NH (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/978,384

(22) Filed: May 14, 2018

(65) Prior Publication Data

US 2019/0348240 A1 Nov. 14, 2019

(51) Int. Cl.
*H01H 37/32* (2006.01)
*F03G 7/06* (2006.01)
*H01H 61/01* (2006.01)

(52) U.S. Cl.
CPC .......... *H01H 37/323* (2013.01); *F03G 7/065* (2013.01); *C21D 2201/01* (2013.01); *H01H 2061/0122* (2013.01)

(58) Field of Classification Search
CPC .......... H01H 37/323; H01H 2061/0122; F03G 7/065; C21D 2201/01
USPC ........................................................ 337/382
See application file for complete search history.

(56) References Cited

U.S. PATENT DOCUMENTS

| | | | | | |
|---|---|---|---|---|---|
| 3,634,803 | A | * | 1/1972 | Willson | H01H 61/0107 337/123 |
| 3,725,835 | A | * | 4/1973 | Hopkins | G11B 21/12 337/140 |
| 3,748,197 | A | * | 7/1973 | Willson | C22F 1/006 148/563 |
| 3,872,415 | A | * | 3/1975 | Clarke | D06L 1/08 337/131 |

(Continued)

FOREIGN PATENT DOCUMENTS

DE 38 09 909 A1 10/1989

OTHER PUBLICATIONS

International Search Report, International Application No. PCT/IB2019/053987, International Filing Date May 14, 2019, Thomson Scientific, AN-1980-C9266C, XP002794107, London, and UKR SELENERGOPROEKT, Jul. 25, 1979 (please see written opinion of International Search report listed above).

*Primary Examiner* — Anatoly Vortman

(57) ABSTRACT

A power switch device has a housing, a movable shuttle and at least one shape memory alloy actuator. The housing has a cavity and stationary current carrying contacts which extend through the housing to the cavity. The movable shuttle with a bridge contact provided in the cavity. The at least one shape memory alloy actuator is attached to a first end of the shuttle and to a first end of the housing. The at least one shape memory alloy actuator is configured to respond to a first activation signal. The at least one shape memory alloy actuator contracts from an initial shape in response to the first actuation signal to move the shuttle and the bridge contact toward the stationary current carrying contacts to a closed position in which the bridge contact is positioned in electrical engagement with the stationary current carrying contacts.

19 Claims, 3 Drawing Sheets

(56) References Cited

U.S. PATENT DOCUMENTS

| | | | | |
|---|---|---|---|---|
| 3,893,055 A * | 7/1975 | Jost | ............... | H01H 61/0107 337/140 |
| 4,302,741 A * | 11/1981 | Warren | ............... | B60Q 1/441 200/16 C |
| 4,423,401 A * | 12/1983 | Mueller | ............... | B81B 3/0086 337/107 |
| 4,544,988 A * | 10/1985 | Hochstein | ............... | H01H 61/0107 337/140 |
| 4,598,347 A * | 7/1986 | Peppers | ............... | F21V 15/01 362/294 |
| 4,806,815 A * | 2/1989 | Honma | ............... | F03G 7/065 310/307 |
| 5,410,290 A * | 4/1995 | Cho | ............... | H01H 61/0107 337/140 |
| 5,990,777 A * | 11/1999 | Whiteman, Jr. | ............... | H01H 61/0107 337/12 |
| 6,016,096 A * | 1/2000 | Barnes | ............... | H01H 61/0107 337/12 |
| 6,236,300 B1 * | 5/2001 | Minners | ............... | H01H 61/0107 148/402 |
| 6,972,659 B2 * | 12/2005 | von Behrens | ............... | E05B 47/0009 337/139 |
| 7,372,355 B2 * | 5/2008 | Agronin | ............... | H01H 3/227 337/123 |
| 8,035,964 B2 * | 10/2011 | Biagini | ............... | H05K 7/20409 165/185 |
| 8,707,694 B2 * | 4/2014 | Olson | ............... | F03G 7/065 60/527 |
| 9,462,928 B2 * | 10/2016 | Marone | ............... | A47L 15/4409 |
| 2007/0137196 A1 | 6/2007 | Hamaguchi et al. | | |
| 2012/0048839 A1 | 3/2012 | Leary et al. | | |
| 2013/0000206 A1 | 1/2013 | O'Kane et al. | | |
| 2014/0339834 A1 | 11/2014 | Alexander et al. | | |
| 2016/0314918 A1 | 10/2016 | Skurkis et al. | | |

* cited by examiner

POWER SWITCH DEVICE WITH SHAPE MEMORY ALLOY ACTUATOR

FIELD OF THE INVENTION

The invention generally relates to an assembly having a shape memory alloy actuator for moving a second member relative to a first member.

BACKGROUND OF THE INVENTION

Existing power switch devices typically have an electromechanical design which incorporate electromechanical actuators (solenoids) that require a significant mass of copper coil winding and magnetic iron as main components. The existing power switch devices, therefore, have significant weight and are costly to manufacture. In addition, as the contacts of the existing power switch devices are often difficult to isolate, additional structure must be provided to facilitate the isolation of the contacts, which increases the weight and cost of the existing power switch devices.

It would, therefore, be beneficial to provide a power switch device which eliminates the requirement for large copper coils and associated magnetic iron components, thus greatly reducing the weight, steady-state power dissipation and cost of the device. It would also be beneficial to provide a power switch device which aids in the electrical isolation and power interruption capabilities of the electrical contacts contained in the power switch device.

SUMMARY OF THE INVENTION

An object is to provide a power switch device which uses a shape memory alloy actuator, thereby eliminating the requirement for large copper coils and associated magnetic iron components.

An object is to provide heat conducting fluid contained in the power switch device to facilitate the conducting of momentary heating of the shape memory alloy actuator and to aid in the electrical isolation and power interruption capabilities of the electrical contacts contained in the power switch device.

An embodiment is directed to a power switch device having a housing, a movable shuttle and at least one shape memory alloy actuator. The housing has a cavity and stationary current carrying contacts which extend through the housing to the cavity. The movable shuttle with a bridge contact is provided in the cavity. The at least one shape memory alloy actuator is attached to a first end of the shuttle and to a first end of the housing. The at least one shape memory alloy actuator is configured to respond to a first activation signal. The at least one shape memory alloy actuator contracts from an initial shape in response to the first activation signal to move the shuttle and the bridge contact toward the stationary current carrying contacts to a closed position in which the bridge contact is positioned in electrical engagement with the stationary current carrying contacts.

An embodiment is directed to a power switch device. The power switch device includes a housing with a cavity and stationary current carrying contacts which extend through the housing to the cavity. A movable shuttle with a bridge contact is provided in the cavity. At least one latching shape memory alloy actuator is attached to a first end of the shuttle and to a first end of the housing. The at least one latching shape memory alloy actuator is configured to respond to a first activation signal. At least one resetting shape memory alloy actuator is attached to a second end of the shuttle and to a second end of the housing. The resetting shape memory alloy actuator is configured to respond to a second activation signal. A heat conductive material is provided in the cavity of the housing and is in contact with the at least one latching shape memory alloy actuator and the at least one resetting shape memory alloy actuator. Wherein the at least one latching shape memory alloy actuator contracts from an initial shape in response to the first actuation signal to move the shuttle and the bridge contact toward the stationary current carrying contacts to a closed position in which the bridge contact is positioned in electrical engagement with the stationary current carrying contacts. Wherein the resetting shape memory alloy actuator contracts from an uncontracted shape in response to the second actuation signal to move the shuttle and the bridge contact away from the stationary current carrying contacts.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
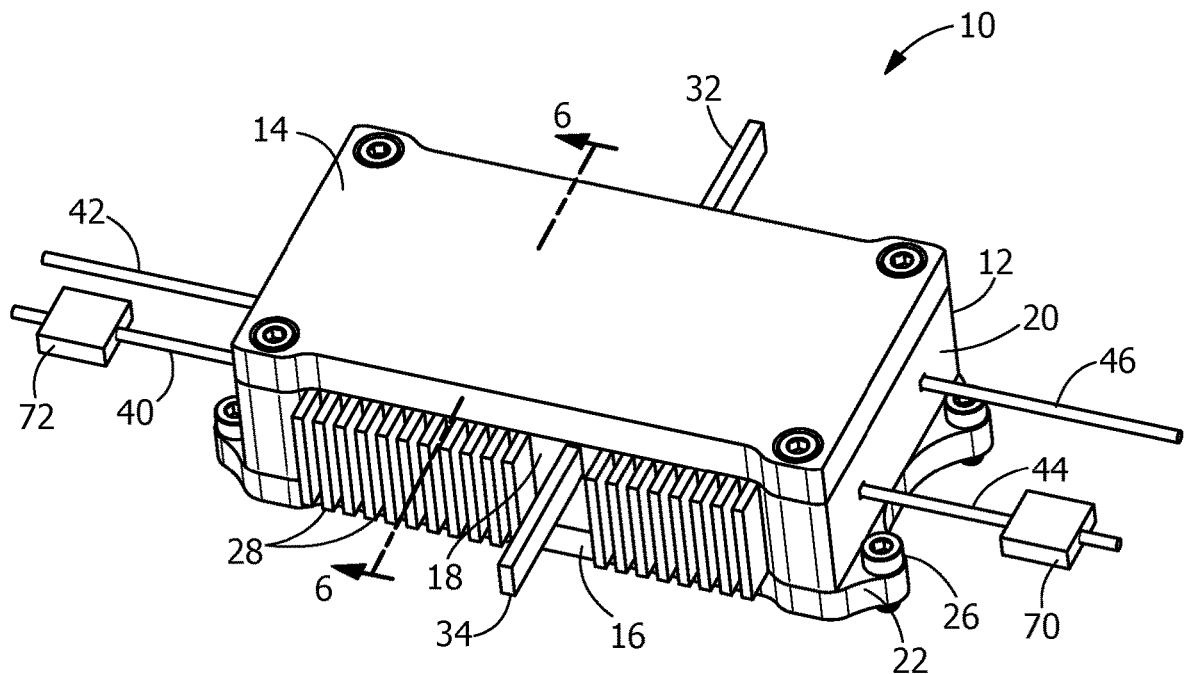
FIG. 1 is a perspective view of an illustrative embodiment of a power switch device according to the present disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

The contactor assembly or power switch device 10 shown in FIG. 1 is included in an electrical circuit in which the power switch device is electrically coupled with one or more electrical loads. The power source for the circuit may be any of a variety of systems, devices and apparatuses that supply electric current to power an electrical load. For example, the power source may be a battery that supplies direct current (DC) or alternating current (AC) to the electrical load.

Figure 3:
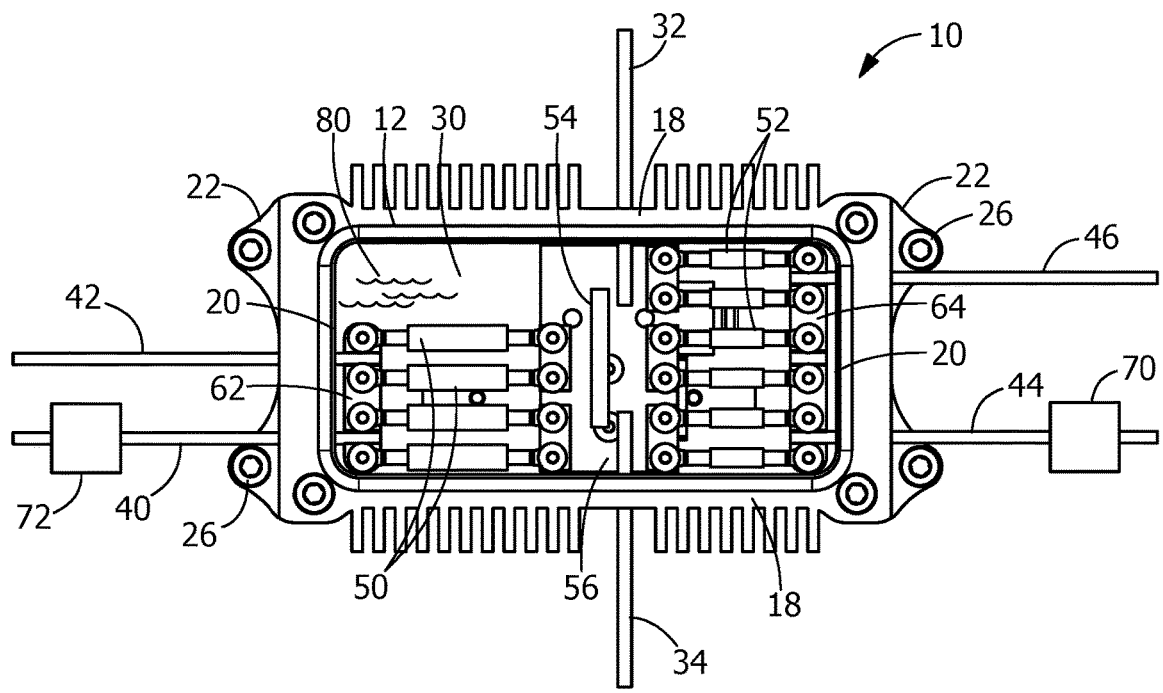
FIG. 3 is a top view of the power switch device of FIG. 2, illustrating the contact shuttle and the bridge contact in the open position, in which the bridge contact is spaced from the stationary contacts.
Figure 4:
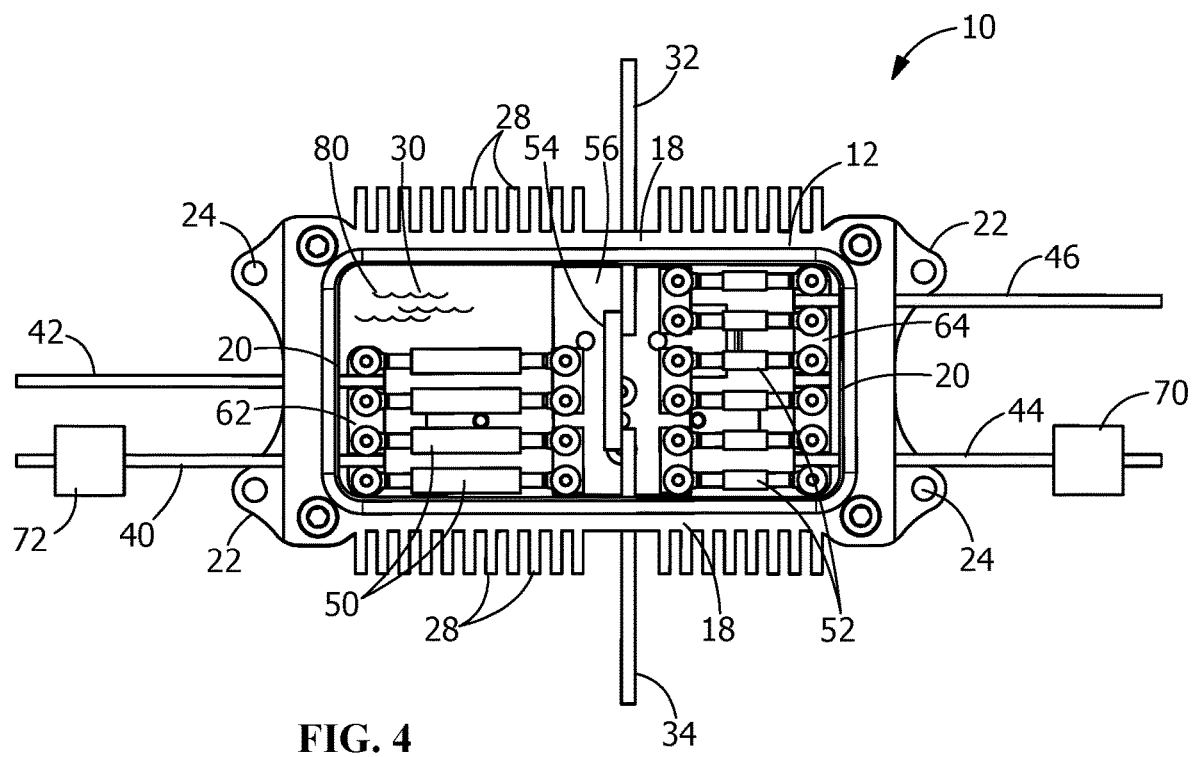
FIG. 4 is a top view of the power switch device similar to FIG. 3, illustrating the contact shuttle and the bridge contact in a closed position, in which the bridge contact is in electrical engagement with the stationary contacts.

The contactor assembly or power switch device 10 is a relay or switch that controls the delivery of power through the circuit. The power switch device 10 alternates between an open state (as shown in FIG. 3) and a closed state (as shown in FIG. 4). In a closed state, the power switch device 10 provides a conductive bridge in order to close the circuit and permit current to be supplied from the power source to the electrical load. In the open state, the power switch device 10 removes the conductive bridge such that the circuit is opened and current cannot be supplied from the power source to the electrical load via the power switch device 10.

Figure 2:
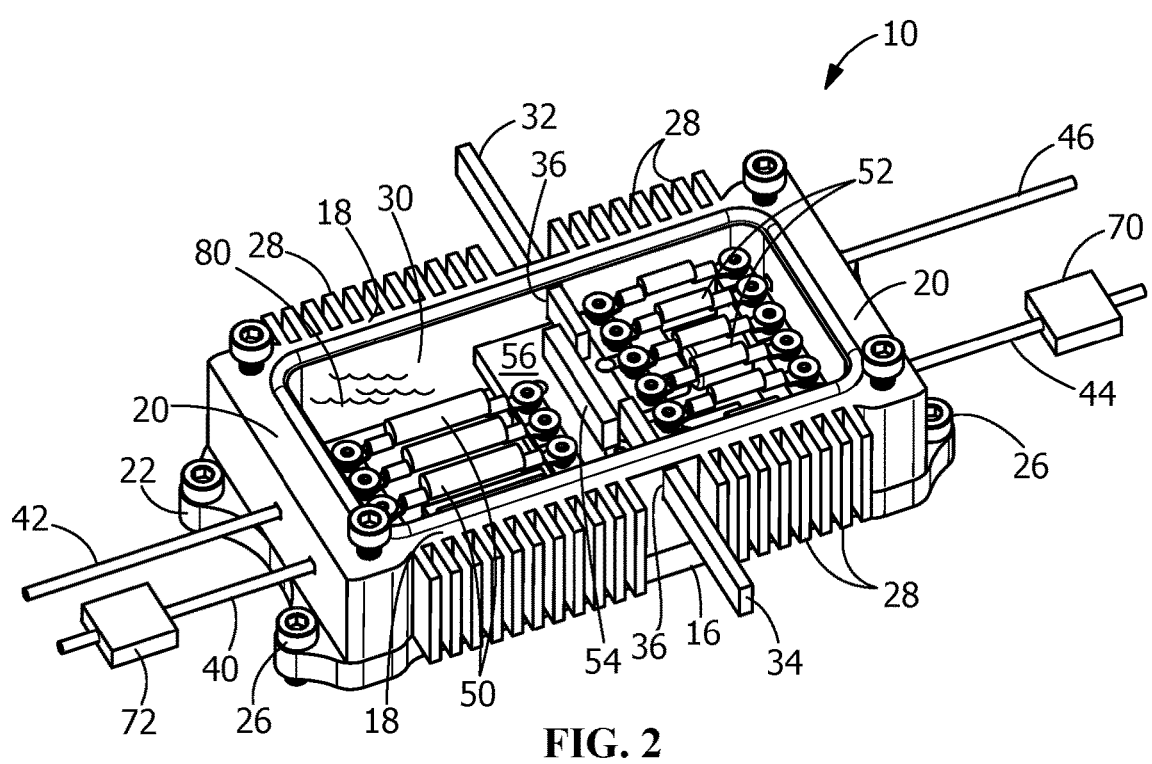
FIG. 2 is a perspective view of the power switch device of FIG. 1 with the cover removed, a contact shuttle and a bridge contact are shown in an open position spaced from stationary contacts.

As shown in FIGS. 1 and 2, an illustrative power switch device 10 has a housing 12 with top wall 14, a bottom wall 16, side walls 18 and end walls 20. The bottom wall 16 has flanges 22 with openings 24 (FIG. 4). Mounting hardware 26 extends through the openings 24 to mount the power switch device 10 as needed. Heat dissipating fins 28 extend from the side walls 18. However, the heat dissipating fins may be provided on ends walls 20, top wall 14 and/or bottom wall 16. While the housing 12 is shown as a rectangular box, the housing may have a different shape. The housing 12 may include, or be formed from, a dielectric material such as one or more polymers. In other embodiments, the housing 12 may include or be formed from conductive materials, such as one or more metal alloys. A cavity 30 is provided in the housing 12. The cavity 30 extends between the top wall 14, the bottom wall 16, the side walls 18 and the end walls 20.

The power switch device 10 includes a set of stationary current carrying contacts 32, 34 that convey current through the housing 12. The contacts 32, 34 extend through openings 36 (FIG. 2) provided in side wall 18. The contacts 32, 34 extend through the sealed openings 36 to mate with conductive bodies that are joined with the electrical circuit, such as the bus bars (not shown).

A power wire 40 and a return wire 42 extend from a respective end wall 20 of the housing 12. The power wire 40 and return wire 42 supply power to the resetting shape memory alloy actuators 50 provided in the cavity 30 of the housing 12. A power wire 44 and a return wire 46 extend from the opposed respective end wall 20 of the housing 12. The power wire 44 and return wire 46 supply power to the latching shape memory alloy actuators 52 provided in the cavity 30 of the housing 12.

As best shown in FIGS. 2 through 5, a bridge contact 54 is mounted on a movable shuttle 56 and positioned in the cavity 30 of the housing 12. With the shuttle 56 in an open position, as shown in FIG. 3, the bridge contact 54 is removed from the stationary current carrying contacts 32, 34. With the shuttle 56 in a closed position, as shown in FIG. 4, the bridge contact 54 is positioned in electrical engagement with the stationary current carrying contacts 32, 34.

Figure 5:
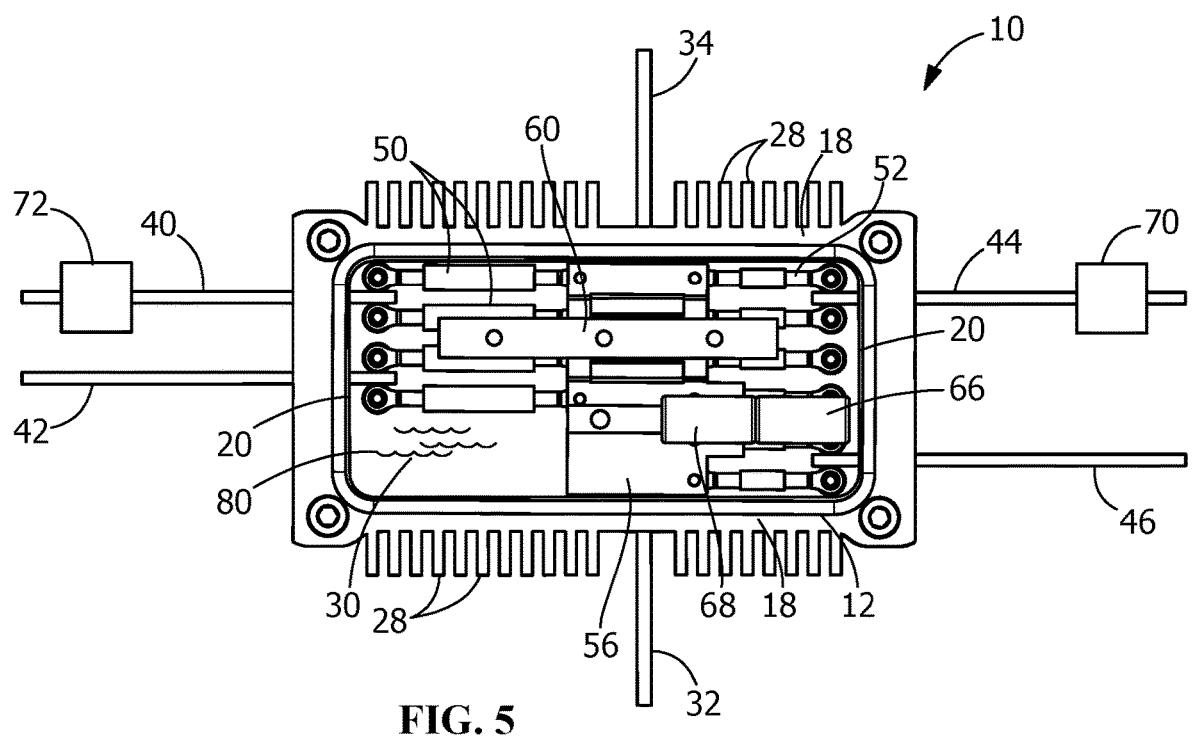
FIG. 5 is a bottom view of the power switch device with a bottom wall removed, illustrating the contact shuttle and the bridge contact in a closed position, in which the bridge contact is in electrical engagement with the stationary contacts and a magnet retains the contact shuttle in the closed position.
Figure 6:
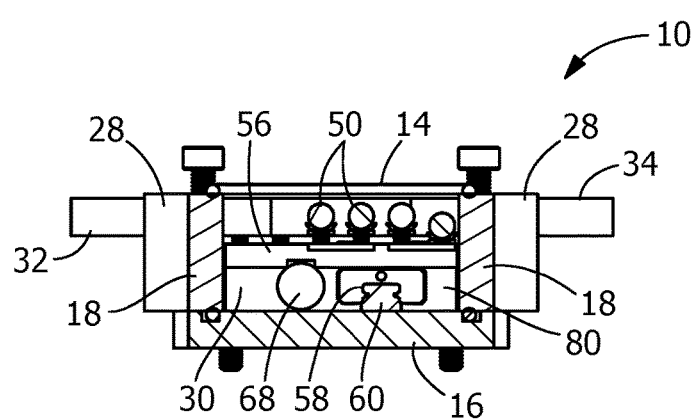
FIG. 6 is a cross-sectional view of the power switch device, taken along line 6-6 of FIG. 1.

As best shown in FIGS. 5 and 6, the shuttle 56 has a recess 58 which is dimensioned to accept a rail 60 therein. The rail 60 is attached to the bottom wall 16 of the housing 12. The rail 60 is dimensioned to be received in the recess 58 of the shuttle 60 to allow the shuttle 60 to move in a direction which is parallel to the longitudinal axis of the rail 60, thereby allowing the shuttle to move between the open and closed positions. Other configurations of the rail 60 and recess 58 may be used without departing from the scope of the invention.

Mounting projections 62, 64 (as best shown in FIGS. 3 and 4) are provided in the cavity 30 proximate the end walls 20. The mounting projections 62, 64 are mounted or integral with the bottom wall 16 and/or the end walls 20.

As best shown in FIGS. 2 through 4, the resetting shape memory alloy actuators 50 extend between and are mounted to the mounting projections 62 and the shuttle 60. The resetting shape memory alloy actuators 50 are provided in electrical engagement with the power wire 40 and a return wire 42. The latching shape memory alloy actuators 52 extend between and are mounted to the mounting projections 64 and the shuttle 60. The latching shape memory alloy actuators 52 are provided in electrical engagement with the power wire 44 and a return wire 46. In the embodiment shown, there are four resetting shape memory alloy actuators 50 and six latching shape memory alloy actuators 52. However, other configurations and numbers of the resetting shape memory alloy actuators 50 and the latching shape memory alloy actuators 52 may be provided.

As best shown in FIG. 5, a magnet 66 is attached to the bottom wall 16 of the housing 12. A mating magnet 68 is attached to the shuttle 60. The magnet 66 and the mating magnet 68 are provided in-line with each other, whereby as the shuttle 60 is moved to the closed position, the magnet 66 and mating magnet 68 are attracted to each other to retain the shuttle 60 in the closed position until a sufficient force is applied to the shuttle 60 to overcome the magnetic attraction. In alternate embodiments, the configuration and number of magnets and mating magnets may vary.

The shape memory alloy actuators 50, 52 include and are manufactured from a shape memory alloy. Suitable shape memory alloys can exhibit a one-way shape memory effect, an intrinsic two-way effect or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys and the like. The alloys can be binary, ternary or any higher order so long as the alloy composition exhibits a shape memory effect, e.g., change in shape orientation, damping capacity and the like.

The latching shape memory alloy actuators 52 contract from an initial or uncontracted shape in response to an actuation signal. Latching shape memory alloy actuators 52 contract to move the shuttle 60 from the open position (as shown in FIG. 3) to the closed position (as shown in FIG. 4). As this occurs, the bridge contact 54 is moved into electrical engagement with the stationary current carrying contacts 32, 34 to complete the electrical circuit. The latching shape memory alloy actuators 52 return to the initial or uncontracted shape upon removal of the actuation signal, thereby allowing the shuttle 60 to move back toward the open position.

In the embodiment shown, the activation signal is an electrical signal provided by the power wire 44 and the return wire 46. However, other activation signals may include any suitable type of signal and is dependent upon the shape memory alloy actuator. For example, the activation signal may include, but is not limited to, a heat signal, a magnetic signal, a pneumatic signal, a mechanical signal and combinations comprising at least one of the foregoing signals, with the particular activation signal dependent on the materials and/or configuration of the active material.

As shown, the latching shape memory alloy actuators 52 are electrically coupled to a control switch 70 in-line through the wires 44, 46. Closing the control switch 70 sends an electrical current or signal through the power wire 44 to the latching shape memory alloy actuators 52, causing the latching shape memory alloy actuators 52 to contract from the initial or uncontracted shape of the latching shape memory alloy actuators 52. Opening the control switch 70 stops the electrical current or signal, thereby allowing the latching shape memory alloy actuators 52 to return to the initial or uncontracted shape. In various embodiments, the control switch 70 may be located within the housing 12. In other embodiments, a control switch may not be provided.

The resetting shape memory alloy actuators 50 contract from an uncontracted shape in response to an actuation signal. Resetting shape memory alloy actuators 50 contract to move the shuttle 60 from the closed position (as shown in FIG. 4) to the open position (as shown in FIG. 3). As this occurs, the bridge contact 54 is moved out of electrical engagement with the stationary current carrying contacts 32, 34 to terminate the electrical circuit. The resetting shape memory alloy actuators 50 return to the initial or uncontracted shape upon removal of the actuation signal, thereby allowing the shuttle 60 to move back toward the closed position.

In the embodiment shown, the activation signal is an electrical signal provided by the power wire 40 and the return wire 42. However, other activation signals may include any suitable type of signal and is dependent upon the shape memory alloy actuator. For example, the activation signal may include, but is not limited to, a heat signal, a magnetic signal, a pneumatic signal, a mechanical signal and combinations comprising at least one of the foregoing signals, with the particular activation signal dependent on the materials and/or configuration of the active material.

As shown, the resetting shape memory alloy actuators 50 are electrically coupled to a control switch 72 in-line through the wires 40, 42. Closing the control switch 72 sends an electrical current or signal through the power wire 40 to the resetting shape memory alloy actuators 50, causing the resetting shape memory alloy actuators 50 to contract from the uncontracted shape of the resetting shape memory alloy actuators 50. Opening the control switch 72 stops the electrical current or signal, thereby allowing the resetting shape memory alloy actuators 50 to return to the uncontracted shape. In various embodiments, the control switch 72 may be located within the housing 12. In other embodiments, a control switch may not be provided.

In operation, in order to move the shuttle 60 and the bridge contact 54 to the closed position in which the bridge contact is in electrical engagement with the stationary current carrying contacts 32, 34, the control switch 70 is closed to provide the latching shape memory alloy actuators 52 with the activation signal, i.e., an electrical current, thereby causing the latching shape memory alloy actuators 52 to contract. As this occurs the control switch 72 remains open, allowing the resetting shape memory alloy actuators 50 to move as the latching shape memory alloy actuators 52 apply a force to the shuttle 60. As the latching shape memory alloy actuators 52 are attached to the fixed mounting projections 64 and a first end 61 of the shuttle 60, the shuttle 60 and the bridge contact 54 are forced to move toward the mounting projections 64 as the latching shape memory alloy actuators 52 contract.

With the shuttle 60 moved to the closed position, the magnet 66 attached to the bottom wall 16 of the housing 12 and the mating magnet 68 attached to the shuttle 60 are moved proximate to or in engagement with each other, such that the magnet 66 and mating magnet 68 are attracted to each other to retain the shuttle 60 in the closed position until a sufficient force is applied to the shuttle 60 to overcome the magnetic attraction. The magnet force is sufficient to retain the shuttle 60 and bridge contact 54 in the closed position even when the control switch 70 is open and no activation signal is provided to the latching shape memory alloy actuators 52.

In order to move the shuttle 60 and the bridge contact 54 to the open position in which the bridge contact is not in electrical engagement with the stationary current carrying contacts 32, 34, the control switch 72 is closed to provide the resetting shape memory alloy actuators 50 with the activation signal, i.e., an electrical current, thereby causing the resetting shape memory alloy actuators 50 to contract. As this occurs, the control switch 70 remains open, allowing the latching shape memory alloy actuators 52 to move as the resetting shape memory alloy actuators 50 apply a force to the shuttle 60. As the resetting shape memory alloy actuators 50 are attached to the fixed mounting projections 62 and a second end 63 of the shuttle 60, the shuttle 60 and the bridge contact 54 are forced to move toward the mounting projections 62 as the resetting shape memory alloy actuators 50 contract. The force of contraction of the resetting shape memory alloy actuators 50 is larger than the magnetic force between the magnets 66, 68, allowing the shuttle 60 and the bridge contact 54 to return to the open position.

With the shuttle 60 moved to the opened position, second magnet (not shown) attached to the bottom wall 16 of the housing 12 and a second mating magnet (not shown) attached to the shuttle 60 are moved proximate to or in engagement with each other, such that the second magnet and second mating magnet are attracted to each other to retain the shuttle 60 in the open position until a sufficient force is applied to the shuttle 60 to overcome the magnetic attraction. The magnet force is sufficient to retain the shuttle 60 and bridge contact 54 in the open position even when the control switch 72 is open and no activation signal is provided to the latching shape memory alloy actuators 50.

In alternate embodiments, additional magnets may be attached to the bottom wall 16 of the housing 12 and additional mating magnets may be attached to the shuttle 60 to also retain the shuttle in the open position even when the control switches 70, 72 are open and no activation signal is provided to the resetting shape memory alloy actuators 50 or the latching shape memory alloy actuators 52.

As the activation signal is applied to the shape memory alloy actuators 50, 52, the shape memory alloy actuators 50, 52 are caused to heat up very quickly. Consequently, heat dissipation of the shape memory alloy actuators 50, 52 must be done quickly and efficiently for the power switch device 10 to operate properly. A heat conductive material 80 is provided in the cavity 30 of the housing to facilitate the heat dissipation. In the illustrative embodiment shown, the heat conductive material 80 surrounds the shape memory alloy actuators 50, 52 such that the shape memory alloy actuators 50, 52 are submersed in the heat conductive material 80.

The heat conductive material of the invention includes any material having properties whereby the majority, or substantially all, of any heat which is transferred to or from the shape memory alloy by the material as a result of contact therebetween is by way of conduction. The heat conductive material of the invention includes materials that have a higher thermal conductivity expressed in W/(mK) than air, that is >0.025 W/(mK). Such materials may include liquids, semi-solids and solids which may be any viscous, semi-viscous or non-viscous. Examples of such material include glycol, silicone paste and oil. Another example is thermal grease (also called thermal compound, heat paste, heat transfer compound, thermal paste or heat sink compound), which increases the thermal conductivity of a thermal interface (by compensating for the irregular surfaces of the components). The thermal conductivity of thermal grease is 0.7-3 W/(mK). Accordingly, the heat conductive material of the invention includes materials that have a thermal conductivity expressed in W/(mK) of >0.6 W/(mK) or in the range of 0.7-3 W/(mK). The heat conductive material of the invention may also include materials that have a thermal conductivity expressed in W/(mK) of >3 W/(mK).

The heat conductive material 80 should have a degree of flexibility or malleability in order that the shape and configuration of the heat conductive material 80 may change along with any change in the geometry of the shape memory alloy actuators 50, 52 while still maintaining contact between the surface of the heat conductive material 80 and the surface of the shape memory alloy actuators 50, 52. The heat transfer material 80 also facilitates the electrical isolation and power interruption capabilities of the electrical contacts contained in the power switch device.

The shape memory alloy arrangement is advantageous in that as a result of contact between the heat conductive material 80 and the shape memory alloy actuators 50, 52 cooling, heating or both of the shape memory alloy actuators 50, 52 can be achieved more quickly compared with a material that does not conduct heat but rather transfers heat by convection, such as a gas.

The shape memory alloy actuators 50, 52 have a cycle time which is dependent on the rate at which the shape memory alloy actuators 50, 52 transform from either the martensite or austenite phases to the other one of the phases and back again. Accordingly, the fast conduction of heat to or from the shape memory alloy actuators 50, 52 by the heat conductive material 80 enables the cycle time of the shape memory alloy actuators 50, 52 to be reduced or increased by a greater amount than would be the case if substantially all heat were transferred to or from the shape memory alloy actuators 50, 52 by a substantially non-heat conductive material. In other words, by contacting the shape memory alloy actuators 50, 52 with a heat conductive material rather than a heat insulating material, the invention increases the speed with which the shape memory alloy actuators 50, 52 can be heated or cooled.

Heat is transferred from the heat transfer material 80 through the housing 12. In particular the heat dissipating fins 28 facilitate the transfer of heat from the heat transfer material 80 in the cavity 30 of the housing 12 to the environment outside of the housing 12.

The power switch device of the present invention eliminates the requirement for large copper coils and associated magnetic iron components as is known and used in the prior art, thus greatly reducing the weight, steady-state power dissipation and cost of the device. The heat conducting fluid contained in the power switch device facilitates the conducting of momentary heating of the shape memory alloy actuators and aids in the electrical isolation and power interruption capabilities of the stationary current carrying contacts and the bridge contact contained in the power switch device.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A power switch device comprising:
   a housing having a cavity, the housing having stationary current carrying contacts which extend through the housing to the cavity;
   a movable shuttle having a bridge contact provided in the cavity, the shuttle having a recess;
   a rail attached to a bottom wall of the housing, the rail being received in the recess of the shuttle to allow the shuttle to move in a direction which is parallel to a longitudinal axis of the rail;

at least one shape memory alloy actuator attached to a first end of the shuttle and to a first end of the housing, the at least one shape memory alloy actuator configured to respond to a first activation signal;

wherein the at least one shape memory alloy actuator contracts from an initial shape in response to the first actuation signal to move the shuttle and the bridge contact toward the stationary current carrying contacts to a closed position in which the bridge contact is positioned in electrical engagement with the stationary current carrying contacts.

2. The power switch device as recited in claim 1, wherein at least one second shape memory alloy actuator is attached to a second end of the shuttle and to a second end of the housing, the second shape memory alloy actuator configured to respond to a second activation signal;

wherein the at least one second shape memory alloy actuator contracts from an uncontracted shape in response to the second actuation signal to move the shuttle and the bridge contact away from the stationary current carrying contacts.

3. The power switch device as recited in claim 1, wherein a heat conductive material is provided in the cavity of the housing and is in contact with the at least one shape memory alloy actuator, the at least one shape memory alloy actuator is at least one latching shape memory alloy actuator.

4. The power switch device as recited in claim 2, wherein a heat conductive material is provided in the cavity of the housing and is in contact with the at least one shape memory alloy actuator and the at least one second shape memory alloy actuator, the at least one shape memory alloy actuator is at least one latching shape memory alloy actuator and the at least one second shape memory alloy actuator is at least one resetting shape memory alloy actuator.

5. The power switch device as recited in claim 3, wherein the heat conductive material provides electrical isolation and power interruption capabilities of the stationary current carrying contacts contained in the power switch device.

6. The power switch device as recited in claim 3, wherein the heat conductive material is configured to control the transfer of heat from the at least one latching shape memory alloy actuator by conduction.

7. The power switch device as recited in claim 3, wherein the heat conductive material has a higher thermal conductivity than air.

8. The power switch device as recited in claim 3, wherein the heat conductive material has flexibility in order that the shape and configuration of the heat conductive material may change along with any change in geometry of the at least one latching shape memory alloy actuator.

9. The power switch device as recited in claim 8, wherein the heat conductive material is a fluid.

10. The power switch device as recited in claim 3, wherein the housing has side walls with heat dissipating fins extending from the side walls.

11. The power switch device as recited in claim 1, wherein the stationary current carrying contacts extend through sealed openings provided in side walls of the housing.

12. The power switch device as recited in claim 1, wherein a first power wire and a first return wire extend through a first end wall of the housing to supply power to the at least one shape memory alloy actuator.

13. The power switch device as recited in claim 12, wherein a control switch is in-line with the first power wire, in the closed position, the control switch sends an electrical current or signal through the first power wire to the at least one shape memory alloy actuator, causing the at least one shape memory alloy actuator to contract.

14. The power switch device as recited in claim 2; wherein a second power wire and a second return wire extend through a second end wall of the housing to supply power to the at least one second shape memory alloy actuator.

15. The power switch device as recited in claim 14, wherein a control switch is in-line with the second power wire, in the closed position, the control switch sends an electrical current or signal through the second power wire to the at least one second shape memory alloy actuator, causing the at least one second shape memory alloy actuator to contract.

16. The power switch device as recited in claim 1, wherein a magnet is attached to a bottom wall of the housing and a mating magnet is attached to the shuttle, the magnet and the mating magnet are provided in-line with each other, wherein as the shuttle is moved to the closed position, the magnet and mating magnet are attracted to each other to retain the shuttle in the closed position.

17. A power switch device comprising:

a housing having a cavity, the housing having stationary current carrying contacts which extend in the housing to the cavity;

a movable shuttle having a bridge contact provided in the cavity, the shuttle having a recess;

a rail attached to the housing, the rail being received in the recess of the shuttle to allow the shuttle to move relative to the rail;

at least one latching shape memory alloy actuator attached to a first end of the shuttle, the at least one latching shape memory alloy actuator configured to respond to a first activation signal;

at least one resetting shape memory alloy actuator is attached to a second end of the shuttle, the resetting shape memory alloy actuator configured to respond to a second activation signal;

a heat conductive material provided in the cavity of the housing and is in contact with the at least one latching shape memory alloy actuator and the at least one resetting shape memory alloy actuator, the heat conductive material having a higher thermal conductivity than air, the heat conductive material transfers heat from the at least one latching shape memory alloy actuator and the at least one resetting shape memory alloy actuator by conduction, the heat conductive material being malleable wherein the shape of the heat conductive material changes as the at least one latching shape memory alloy actuator responds to the first activation signal and the resetting shape memory alloy actuator responds to the second activation signal;

wherein the at least one latching shape memory alloy actuator contracts from an initial shape in response to the first actuation signal to move the shuttle and the bridge contact toward the stationary current carrying contacts to a closed position in which the bridge contact is positioned in electrical engagement with the stationary current carrying contacts;

wherein the resetting shape memory alloy actuator contracts from an uncontracted shape in response to the second actuation signal to move the shuttle and the bridge contact away from the stationary current carrying contacts.

18. The power switch device as recited in claim 17, wherein
- a first power wire and a first return wire extend through a first end wall of the housing to supply power to the at least one latching shape memory alloy actuator, a first control switch is in-line with the first power wire, in the closed position, the first control switch sends an electrical current or signal through the first power wire to the at least one latching shape memory alloy actuator, causing the at least one latching shape memory alloy actuator to contract; and
- a second power wire and a second return wire extend through a second end wall of the housing to supply power to the at least one resetting shape memory alloy actuator, a second control switch is in-line with the second power wire, in the closed position, the second control switch sends an electrical current or signal through the second power wire to the at least one resetting shape memory alloy actuator, causing the at least one resetting shape memory alloy actuator to contract.

19. The power switch device as recited in claim 17, wherein a magnet is attached to a bottom wall of the housing and a mating magnet is attached to the shuttle, the magnet and the mating magnet are provided in-line with each other, wherein as the shuttle is moved to the closed position, the magnet and mating magnet are attracted to each other to retain the shuttle in the closed.

* * * * *